United States Patent [19]
Wei-Cheng

[11] 3,796,856
[45] Mar. 12, 1974

[54] SOLDER FEEDING ELECTRIC SOLDERING IRON

[76] Inventor: Kuo Wei-Cheng, No. 48, Pa-Teh Rd., Section 1, Taiwan, China

[22] Filed: Sept. 20, 1972

[21] Appl. No.: 290,647

[52] U.S. Cl. ............... 219/230, 219/235, 219/238, 226/127, 226/155, 228/53
[51] Int. Cl. .......................... H05b 1/00, B23k 3/06
[58] Field of Search .................... 219/221, 227–241; 228/51–55; 226/127, 153, 155, 188

[56] References Cited
UNITED STATES PATENTS

| | | | |
|---|---|---|---|
| 2,590,806 | 3/1952 | Vorderstrasse | 226/155 |
| 2,119,462 | 5/1938 | Kull et al. | 228/53 |
| 2,901,585 | 8/1959 | Baccari | 228/53 |
| 2,432,428 | 12/1947 | Lang | 219/230 UX |
| 2,952,763 | 9/1960 | Gustafsson | 219/230 X |
| 2,692,935 | 10/1954 | Pearce | 219/230 |

FOREIGN PATENTS OR APPLICATIONS

| | | | |
|---|---|---|---|
| 618,620 | 3/1961 | Italy | 219/229 |
| 528,977 | 6/1955 | Italy | 219/227 |
| 668,005 | 9/1964 | Italy | 219/230 |
| 1,165,367 | 5/1958 | France | 228/52 |

*Primary Examiner*—A. Bartis
*Attorney, Agent, or Firm*—McGlew and Tuttle

[57] ABSTRACT

An electric soldering iron has a grip from which there extends a heated copper soldering tip. A roll of wound wire-solder is housed within the grip and the wire-solder is led through a guide to a point adjacent the soldering tip. The wire-solder is fed by being gripped between a pair of gears, one of which is secured to a disk and the other of which is spring biased toward the first gear. The peripheries of the two gears are formed with mating annular grooves through which the wire solder extends. The disk has a knurled periphery which projects outwardly through a side wall of the grip. Wire solder can be delivered to the pointed head of the tip of the heater through the wire-delivery pipe by rotating the periphery of the disk with a finger tip and the soldering can be conducted easily with one hand.

6 Claims, 7 Drawing Figures

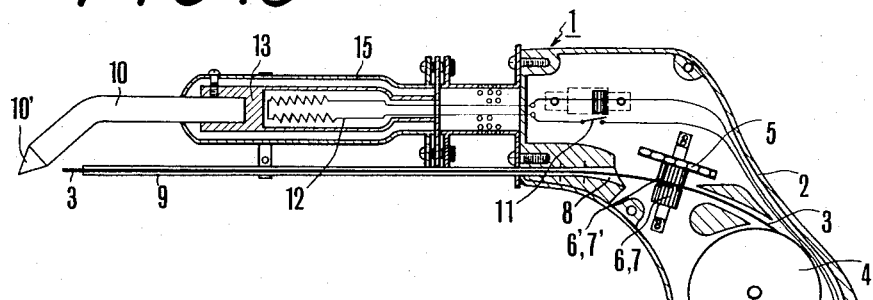
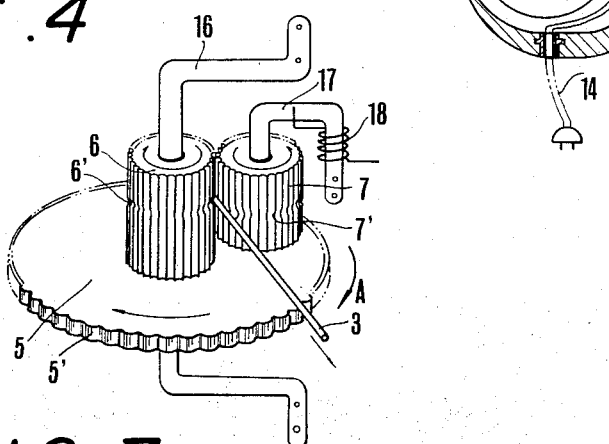
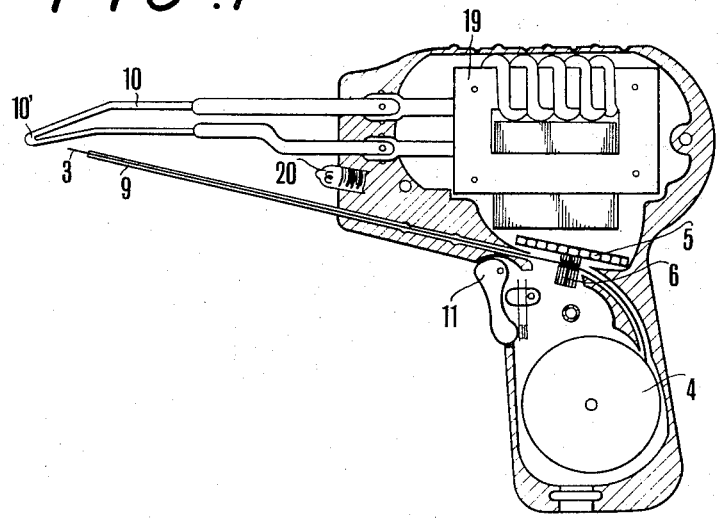

SOLDER FEEDING ELECTRIC SOLDERING IRON

FIELD AND BACKGROUND OF THE INVENTION

This invention realtes to electric soldering irons and, more particularly, to an improved electric soldering iron containing a supply of wire-solder and feeding means therefor and by means of which soldering may be effected with one hand.

Traditionally, soldering of metal products has been conducted by melting solder held by one hand with an electric soldering iron held by the other hand. Because an electric soldering iron and solder are thus separately held by the hands, or solder is placed separately for use, soldering has been inconvenient and inefficient.

SUMMARY OF THE INVENTION

In the present invention, the disadvantages of an electric soldering iron mentioned above have been overcome, and the wire-solder delivery mechanism is provided to a conventional electric soldering iron to make soldering work simple and reduce the work time remarkably.

In accordance with the invention, a hollow grip is provided and rotatably mounts a roll of wound wire-solder. A heated copper soldering tip extends from the grip to a pointed end, in one embodiment, and as a bight in another embodiment. A wire guide extends from the grip to the soldering tip, and the wire-solder is guided through this guide. The grip contains feeding means operable by a knurled disk whose periphery projects a slight distance laterally from a side surface of the grip. The disk rotates a first gear which meshses with a second gear spring biased toward the first gear, the two gears being formed with mating annular grooves through which the wire solder extends.

In a first embodiment of the invention, a stem extends forwardly from the grip and contains a heater for a copper bar type of soldering tip. In a second embodiment of the invention, a heating transformer is mounted in the soldering iron adjacent the grip and has terminals connected to opposite ends of a bight type soldering tip.

An object of the invention is to provide an improved electric soldering iron.

Another object of the invention is to provide such a soldering iron with which soldering can be effected with one hand.

A further object of the invention is to provide such an electric soldering iron which is simple in construction and easy to use.

For an understanding of the principles of the invention, reference is made to the following description of typical embodiments thereof as illustrated in the accompanying drawings.

BRIEF DESCRIPTION OF THE DRAWINGS

In the Drawings:

FIG. 3 is a longitudinal sectional view through the soldering iron shown in FIGS. 1 and 2;

FIG. 4 is a view illustrating the wire-solder feed mechanism;

FIG. 7 is a longitudinal sectional view of the soldering iron shown in FIGS. 5 and 6.

DESCRIPTION OF THE PREFERRED EMBODIMENTS

Figure 1:
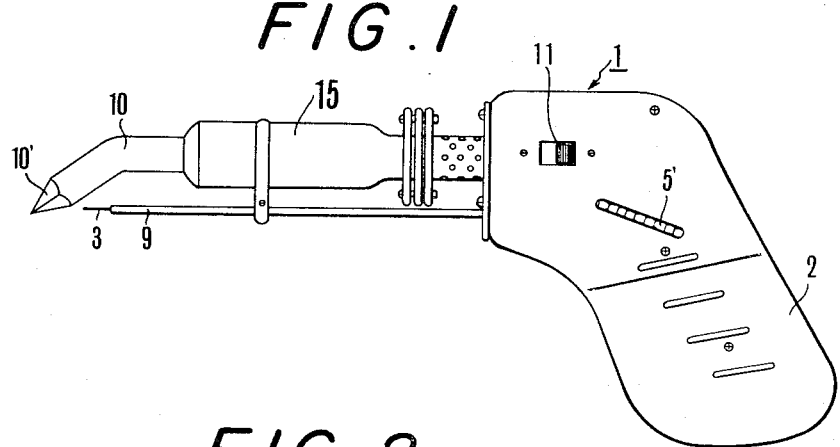
FIG. 1 is a side elevation view of one form of electric soldering iron embodying the invention.
Figure 2:
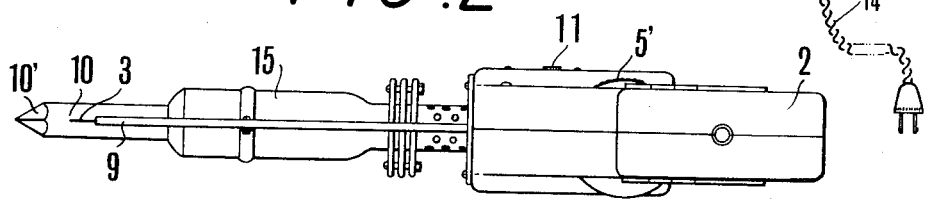
FIG. 2 is a bottom plan view of the soldering iron shown in FIG. 1.

As shown in FIG. 1, FIG. 2, and FIG. 3, in the general construction of the soldering iron (1), when the switch (11) on the upper left side of the grip (2) is closed, the electric heater (12) is energized by the current passing through the cord (14) and the copper tip (10) is heated. When the periphery (5') of the disk (5) protruding from the center of the left side of the grip (2) is rotated forward with a finger (thumb), the wire-solder (3) is delivered through the wire-delivery pipe (9) fixed to the underside of the electric heater support (15) and is melted at the contact of the pointed head (10') of the heated copper tip (10).

As shown in FIG. 3, in the wire-solder delivery mechanism, the roll (4) of wire-solder (3) wound up in a coil is housed inside the grip (2) of the electric soldering iron (1) and wire-solder (3) can be said by means of the toothed wheels or gears (6) (7) for delivery to the pointed head (10') of the copper tip (10) through the wire-delivery pipe (9) from the entrance (8) of the wire-delivery pipe. As shown in FIG. 4, in the detailed construction of the feeding gears the gear (6) fixed to the disk (5) is freely rotatably supported by the shaft (16), and the gear (7) which is rotatable on the U-shaped shaft (17), is pressed by spring (18) to engage gear (6). By rotating the periphery (5') of the disk (5) with a finger in the direction of an arrow (A), wire-solder (3) gripped, due to the bias of the spring (18), between the semicircular grooves (6') and (7') provided in the center can be delivered forward.

Figure 5:
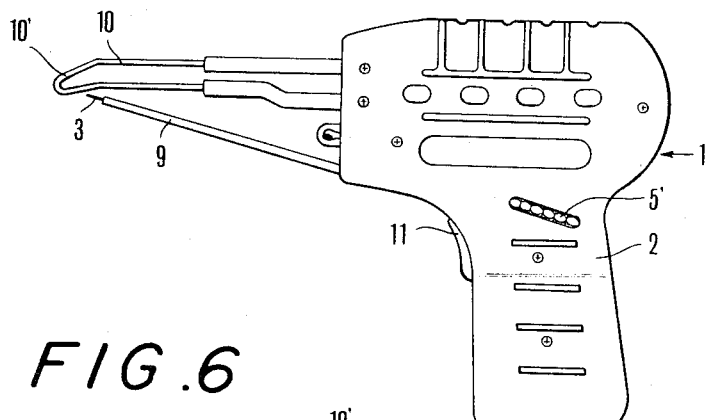
FIG. 5 is a side elevation view of another form of electric soldering iron embodying the invention.
Figure 6:
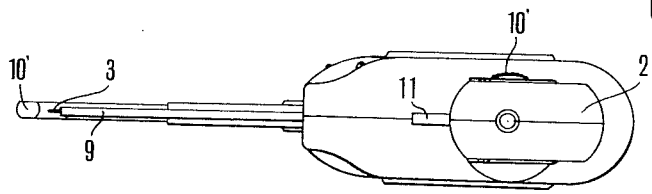
FIG. 6 is a bottom plan view of the soldering iron shown in FIG. 5.

The embodiment of the invention shown in FIGS. 5, 6 and 7 differs from that shown in FIGS. 1 through 4 in that above the grip there is a recess in which is mounted a transformer 19 for providing the heating current to the soldering tip 10. The wire-solder is fed upwardly and forwardly in a guide 9 toward the pointed end 10' of the tip 10. The feeding means is the same as mentioned for the embodiment of the invention shown in FIGS. 1 to 4. The switch 11, in the embodiment of FIGS. 5, 6 and 7, is a trigger type switch, and indicating lamp 20 is provided to when the soldering iron is energized.

As descrived above, the electric soldering iron in the present invention has a wire-solder delivery mechanism by which soldering can be conducted easily by delivering wire-solder with one hand holding the soldering iron , and the work efficiency can remarkably be improved.

What is claimed is:

1. An electric soldering iron comprising, in combination, a grip having a recess therein for mounting a coil of wire-solder; a pointed soldering tip extending from said grip; means operatively associated with said tip and operable to electrically heat said tip; wire guide means extending from said recess to adjacent the point of said tip; a pair of gears rotatably mounted in said grip in intermeshing relation with each other, said gears being arranged to grip wire-solder therebetween to deliver wire-solder from said coil through said wire guide means to the point of said soldering tip; said gears being formed with facing and mating annular recesses in their teeth intermediate the axially opposite ends of their teeth to receive the wire-solder; one of said gears being secured to a support shaft in said grip for rotation with said support shaft; a finger tip-actuated operator connected to said support shaft for rotation thereof and projecting through an opening through in the wall of said grip, said operator constituting the sole operating means for said wire-solder feeding gears whereby said soldering iron may be held with one hand and wire-solder may be fed to the point of said soldering tip by actuating said operator with the finger tip of said one hand; a second shaft rotatably supporting the other gear; and spring means biasing said second shaft to maintain said other gear engaged with said one gear to grip wire-solder therebetween.

2. An electric soldering iron, as claimed in claim 1, in which said operator comprises a disk secured to said support shaft and having its periphery projecting through said opening in said wall of said grip.

3. An electric soldering iron, as claimed in claim 2, in which the periphery of said disk is knurled.

4. An electric soldering iron, as claimed in claim 1, in which said soldering tip is mounted in a support extending from said grip, and said tip heating means comprises an electrically energized heater in said support; said soldering tip comprising a copper bar having its inner end secured in said heater; said wire guide means being supported from said support.

5. An electric soldering iron, as claimed in claim 1, in which the soldering tip heating means comprises a heating transformer mounted in said grip; said soldering tip comprising an electrically conductive loop projecting from said grip and having a pointed bight, the ends of said loop being electrically connected to terminals of said transformer.

6. An electric soldering iron, as claimed in claim 5, in which said wire guide means extends forwardly and upwardly at an angle toward the bight of said loop.

* * * * *